US012048068B2

(12) United States Patent
Kim et al.

(10) Patent No.: US 12,048,068 B2
(45) Date of Patent: Jul. 23, 2024

(54) HEATING ELEMENT HAVING FUSE FUNCTION AND HEATER UNIT COMPRISING SAME

(71) Applicant: AMOGREENTECH CO., LTD., Gimpo-si (KR)

(72) Inventors: Jeong Hwan Kim, Gimpo-si (KR); Won San Na, Gimpo-si (KR); Jin Pyo Park, Gimpo-si (KR); Jae Yeong Lee, Gimpo-si (KR); Hyun Chul Lim, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 287 days.

(21) Appl. No.: 17/424,578

(22) PCT Filed: Jan. 20, 2020

(86) PCT No.: PCT/KR2020/000921
§ 371 (c)(1),
(2) Date: Jul. 21, 2021

(87) PCT Pub. No.: WO2020/153684
PCT Pub. Date: Jul. 30, 2020

(65) Prior Publication Data

US 2022/0086957 A1 Mar. 17, 2022

(30) Foreign Application Priority Data

Jan. 22, 2019 (KR) ........................ 10-2019-0008249
Jan. 17, 2020 (KR) ........................ 10-2020-0006386

(51) Int. Cl.
*H05B 1/02* (2006.01)
*H05B 3/20* (2006.01)

(52) U.S. Cl.
CPC ......... *H05B 1/0205* (2013.01); *H05B 1/0236* (2013.01); *H05B 3/20* (2013.01); *H05B 2203/02* (2013.01)

(58) Field of Classification Search
CPC ...... H05B 1/0205; H05B 1/0236; H05B 3/20; H05B 2203/02; H01H 85/08–12
See application file for complete search history.

(56) References Cited

U.S. PATENT DOCUMENTS 1,227,752 A * 5/1917 Cole ...................... H01H 85/10 337/293
5,243,682 A * 9/1993 Eberts .................... A45D 20/16 392/374
(Continued)

FOREIGN PATENT DOCUMENTS

JP H08-096928 A 4/1996
JP H08138837 A 5/1996
(Continued)

OTHER PUBLICATIONS

Office Action issued in CN Application No. 202080007694.5 dated Dec. 20, 2022 (9 pages).
(Continued)

*Primary Examiner* — Jacob R Crum
(74) *Attorney, Agent, or Firm* — Rothwell, Figg, Ernst and Manbeck, P.C.

(57) ABSTRACT

Provided is a heating element having a fuse function. The heating element having a fuse function according to an exemplary embodiment of the present invention includes a plurality of heat sources which generate heat when power is applied, a fuse member of which both end portions are physically connected to two heat sources disposed to be spaced apart from each other by a gap to connect the two heat sources in series and which is fused to electrically disconnect the two heat sources when a temperature is
(Continued)

higher than or equal to a preset temperature, and an insulating member which surrounds the plurality of heat sources and the fuse member.

10 Claims, 3 Drawing Sheets

(56) References Cited

U.S. PATENT DOCUMENTS

| | | | | |
|---|---|---|---|---|
| 7,106,165 | B2 * | 9/2006 | Mukai | H01M 50/581 337/401 |
| 7,142,088 | B2 * | 11/2006 | Tanaka | H01H 37/761 337/296 |
| 2002/0113685 | A1 * | 8/2002 | Izaki | H01M 50/574 337/404 |
| 2004/0184211 | A1 * | 9/2004 | Bender | H01H 69/022 361/104 |
| 2011/0062145 | A1 | 3/2011 | Yang et al. | |
| 2011/0184502 | A1 | 7/2011 | Bruder | |
| 2019/0267207 | A1 * | 8/2019 | Jaster | H01H 85/47 |

FOREIGN PATENT DOCUMENTS

| | | | |
|---|---|---|---|
| JP | 2005078803 | A | 3/2005 |
| KR | 10-0906938 | B1 | 7/2009 |
| KR | 10-2010-0100285 | A | 9/2010 |
| KR | 10-2013-0121637 | A | 11/2013 |
| KR | 10-1416170 | B1 | 7/2014 |

OTHER PUBLICATIONS

International Search Report issued in PCT/KR2020/000921 dated Jun. 30, 2020, 2 pages.

* cited by examiner

HEATING ELEMENT HAVING FUSE FUNCTION AND HEATER UNIT COMPRISING SAME

CROSS REFERENCE TO RELATED APPLICATIONS

This application is the national phase entry of International Application No. PCT/KR2020/000921, filed on Jan. 20, 2020, designating the United States, which is based upon and claims priority to Korean Patent Applications 10-2019-0008249, filed on Jan. 22, 2019 and 10-2020-0006386, filed on Jan. 17, 2020, the entire contents of which are incorporated herein by reference.

TECHNICAL FIELD

The present invention relates to a heating element, and more specifically, to a heating element having a self-fuse function and a heater unit including the heating element.

BACKGROUND

Heaters using general nichrome wires have a risk of igniting when overheated. Accordingly, electric vehicles are equipped with heater units using positive temperature coefficient (PTC) elements for heating.

However, the heater unit using the PTC element as a heating element may not obtain a large amount of heat because there is a limitation in increasing a size of the PTC element.

In addition, in the heater unit using the PTC element, since a conductive carbon mixture, which is a conductor, is coupled to only a part of a heating surface of the PTC element, there are problems in that a temperature distribution for each part of the conductor is not uniform and temperatures transferred to radiating fins are different.

Accordingly, development of a heating element and a heater unit capable of forming a uniform temperature distribution and obtaining a large amount of heat is required.

In addition, since the heater unit using the PTC element operates in a manner in which heat generated by the heating element is transferred to the radiating fins and heats air coming into contact with the radiating fins, heat resistance occurs in a process in which the heat is transferred to the fins from the heating element, and thus there is a structural problem in that heat density is significantly lowered.

SUMMARY OF THE INVENTION

The present invention is directed to providing a heating element, which is capable of increasing heat density by decreasing heat resistance and also has a fuse function for preventing ignition due to overheating occurring while heating, and a heater unit including the heating element.

In addition, the present invention is also directed to providing a heating element having a fuse function, which is capable of obtaining a uniform temperature distribution and a large amount of heat, and a heater unit including the heating element.

One aspect of the present invention provides a heating element having a fuse function that includes a plurality of heat sources which generate heat when power is applied, a fuse member of which both end portions are physically connected to two of the heat sources disposed to be spaced apart from each other by a gap to connect the two heat sources in series and which is fused to cut an electrical connection of the two heat sources when a temperature is higher than or equal to a preset temperature, and an insulating member which surrounds the plurality of heat sources and the fuse member.

The heat source may be a plate-shaped conductive member having a predetermined area. As an example, the heat source may be a plate-shaped sheet including at least one kind among an amorphous ribbon sheet, a metal sheet, a Kanthal and a Fecalloy.

The fuse member may be a plate-shaped conductive member having a predetermined area. As an example, the fuse member may be formed of at least one kind of metal material among lead, tin, zinc, cadmium, copper, and a combination thereof.

The both end portions of the fuse member may be connected to upper surfaces or lower surfaces of the two heat sources disposed to be spaced apart from each other by the gap.

The fuse member may include a first fuse member of which both end portions are connected to upper surfaces of the two heat sources disposed to be spaced apart from each other by the gap and a second fuse member of which both end portions are connected to lower surfaces of the two heat sources. In this case, at least a part of the first fuse member and at least a part of the second fuse member may be in contact with each other between the two of a first heat source and a second heat source.

The insulating member may be a film member having an insulation property.

The heating element may be formed to be bent a plurality of times in a longitudinal direction to form a flow path through which a fluid passes. In this case, the heating element may be formed to be bent the plurality of times in the longitudinal direction to alternately form a mountain portion and a valley portion, and the flow path may be a space formed by the mountain portion and the valley portion.

The heating element may further include a metal sheet attached to one surface of the insulating member through an adhesive layer.

Another aspect of the present invention provides a heater unit including the heating element having a fuse function.

According to an embodiment, since a fuse function is embedded in a heating element, a plurality of heat sources which generate heat when power is applied are fused in a case in which the plurality of heat sources generate heat at a high temperature higher than or equal to a preset temperature so that a current can be blocked from flowing and ignition due to overheating can be prevented. Then, the heater itself can be protected even when a controller fails.

In addition, in the present invention, since the heating element is implemented in a plane shape, heat resistance can be lowered, heating efficiency can be improved, and reactivity can be improved.

BRIEF DESCRIPTION OF THE DRAWINGS

FIG. 2 is a view in which FIG. 1 is viewed from the front.

DETAILED DESCRIPTION OF THE INVENTION

Figure 1:
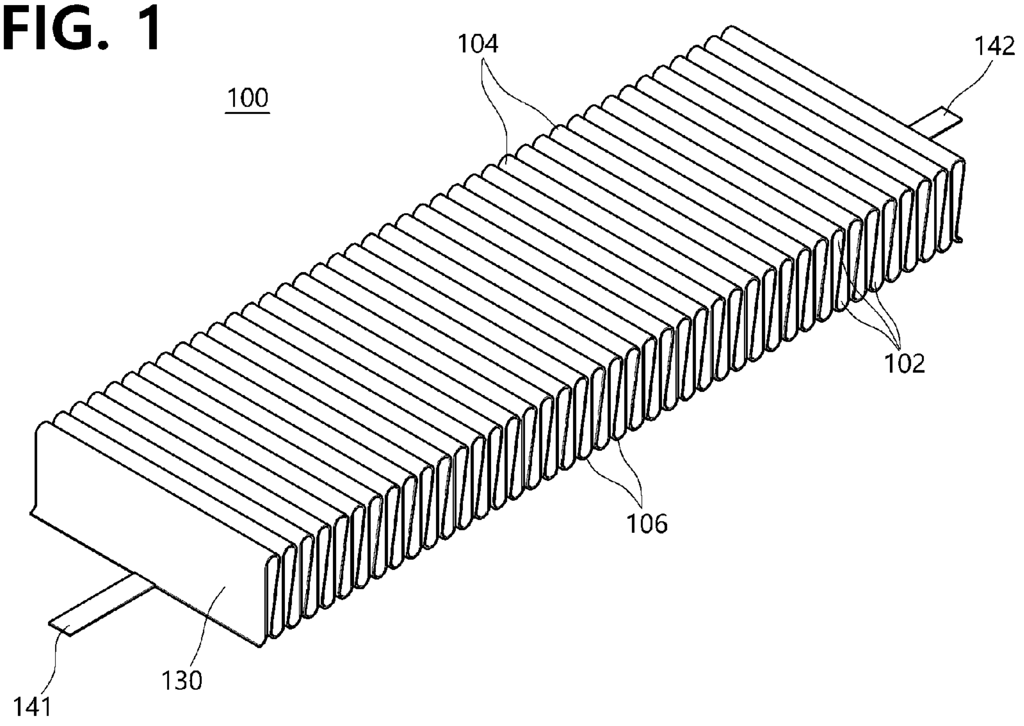
FIG. 1 is a schematic view illustrating a heating element having a fuse function according to one embodiment of the present invention.

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to the description will be omitted in order to clearly describe the present invention, and the same or similar parts are denoted by the same reference numerals throughout this specification.

As illustrated in FIGS. 1 to 7, a heating element 100 or 200 having a fuse function according to one embodiment of the present invention includes a plurality of heat sources 110, a fuse member 120, 120', or 120", and an insulating member 130.

The plurality of heat sources 110 may generate heat when power is applied. As illustrated in FIGS. 4 to 7, the plurality of heat sources 110 may be disposed to be spaced apart from each other by a gap in a longitudinal direction of the heating element 100 or 200 and electrically connected to each other by the fuse member 120, 120', or 120".

That is, the plurality of heat sources 110 may be disposed to be spaced apart from each other in the longitudinal direction of the heating element 100 or 200, and two heat sources 110 disposed to be spaced apart from each other by the gap in the longitudinal direction may be connected by the fuse member 120, 120', or 120" in series.

Accordingly, in a case in which external power is applied, the plurality of heat sources 110 may generate heat by being electrically connected through the fuse member 120, 120', or 120".

In this case, each of the plurality of heat sources 110 may be provided in a plate shape having a predetermined area. That is, the heat source 110 may be a plate-shaped conductive member which generates heat when power is applied.

As a non-restrictive example, an amorphous ribbon sheet may be used as the heat source 110. Here, the amorphous ribbon sheet may be a ribbon sheet including at least one kind of an amorphous alloy and a nano-crystal alloy. In addition, the heat source 110 may be a plate-shaped metal sheet having the predetermined area, and aluminum, copper, or the like may be used for the metal sheet.

In addition, the heat source 110 may also be a plate-shaped conductive member including at least one kind of Kanthal and Fecalloy to prevent crystallization due to exposure to repeated thermal fatigue.

However, the material of the heat source 110 is not limited thereto, and a linear-shaped conductive member may be arranged in a predetermined pattern and implemented in a plate shape or a plane shape as the heat source 110, and when a heat source is implemented in a plane shape or plate shape, any known heat source which can be used as a heater may be used as the heat source 110.

In this case, the plurality of heat sources 110 forming the heating element 100 or 200 may be provided to have the same areas or different areas.

Through this, the heating element 100 or 200 having a fuse function according to one embodiment of the present invention may be implemented as a plane-shaped heating element in which the plurality of heat sources 110 having the predetermined area are electrically connected to each other by the fuse member 120, 120', or 120".

Accordingly, in the heating element 100 or 200 having a fuse function according to one embodiment of the present invention, when power is applied, since the heat sources 110 having the predetermined area may generate heat at the same time, a heating area may be increased, and since a heat exchange area with air may be increased through the increased heating area, reactivity can be improved.

In addition, in the heating element 100 or 200 having a fuse function according to one embodiment of the present invention, since heat can be generated at the predetermined area of each of the heat sources 110, even when a total length is increased, a uniform heating temperature can be implemented regardless of a position.

The fuse member 120, 120', or 120" may physically connect the two heat sources 110 disposed to be spaced apart from each other by the gap in the longitudinal direction of the heating element 100 or 200. Accordingly, the fuse member 120, 120', or 120" may connect the two heat sources 110 in series.

In this case, the fuse member 120, 120', or 120" may be fused in a case in which the plurality of heat sources 110 generates heat, when power is applied, at a high temperature higher than or equal to a preset temperature so that a current is prevented from flowing to the plurality of heat sources 110.

Through this, in the heating element 100 or 200 having a fuse function according to one embodiment of the present invention, since a current blocking function is implemented by itself through the fuse member 120, 120', or 120", ignition due to overheating can be prevented.

In addition, in the heating element 100 or 200 having a fuse function according to one embodiment of the present invention, since the current blocking function is embedded by itself, a self-protection function may be performed through the fuse member 120, 120', or 120" even when an external controller, for example, a heater controller, fails, and thus stability can be improved.

In this case, in a case in which the plurality of heat sources 110 connected in series generate heat at a high temperature higher than or equal to a preset value, the fuse member 120, 120', or 120" may be melted and disconnected by the heat transferred from the heat sources 110 so that the current may be blocked.

As an example, the fuse member 120, 120', or 120" may be formed of at least one kind of metal material among lead, copper, tin, zinc, cadmium, and a combination thereof. However, the material of the fuse member 120, 120', or 120" is not limited thereto, and any known material capable of being used as a fuse may be applied as the material of the fuse member 120, 120', or 120".

In addition, although the fuse member 120, 120', or 120" may be provided in a linear shape having a predetermined length, the fuse member 120, 120', or 120" may be provided in a plate shape having a predetermined area like the heat source 110 to reduce a possibility of breaking due to an external force.

The fuse member 120, 120', or 120" may physically connect the two heat sources 110 disposed to be spaced apart from each other by the gap in various manners.

Figure 4:
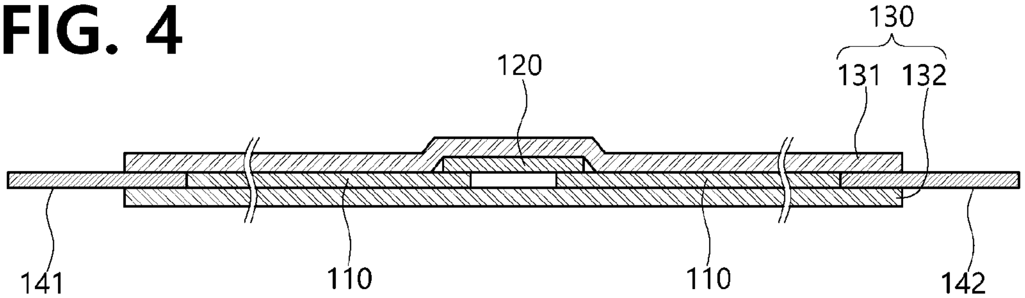
FIG. 4 is a cross-sectional view taken along line A-A of FIG. 3 and illustrates a connection relationship of two heat sources and a fuse member.
Figure 5:
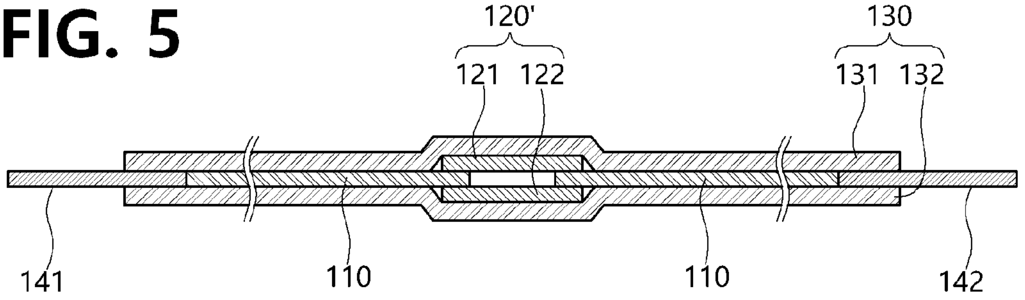
FIG. 5 is a cross-sectional view taken along line A-A of FIG. 3 and illustrates another example of a connection relationship of two heat sources and a fuse member.
Figure 6:
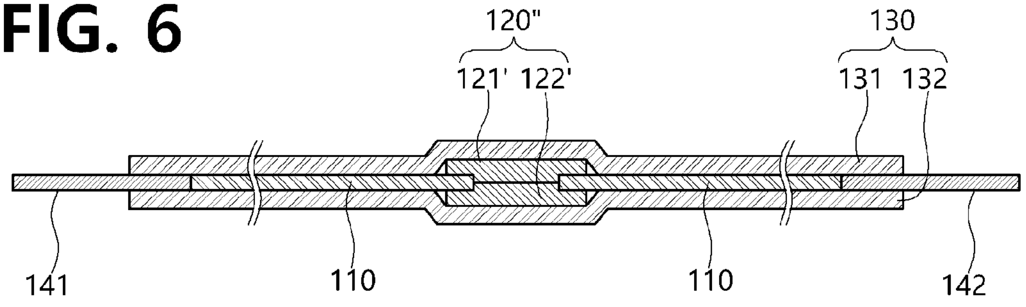
FIG. 6 is a cross-sectional view taken along line A-A of FIG. 3 and illustrates still another example of a connection relationship of two heat sources and a fuse member.

As an example, the fuse member 120, 120', or 120" may connect the two heat sources 110 in series through one of manners of FIGS. 4 to 6.

Specifically, the fuse member 120 may connect the same surfaces of the two heat sources 110 disposed to be spaced apart from each other by the gap. That is, as illustrated in FIG. 4, the fuse member 120 may be connected to upper surfaces of the two heat sources 110 disposed to be spaced apart from each other by the gap. In addition, the fuse member 120 may be connected to lower surfaces of the two heat sources 110 disposed to be spaced apart from each other by the gap.

As another example, the fuse member 120' or 120" may include a first fuse member 121 or 121' and a second fuse member 122 or 122' as illustrated in FIGS. 5 and 6. In this case, the first fuse member 121 or 121' may be connected to the upper surfaces of the two heat sources 110 disposed to be spaced apart from each other by the gap, and the second fuse member 122 or 122' may be connected to the lower surfaces of the two heat sources 110 disposed to be spaced apart from each other by the gap.

Through this, even when any one of the first fuse member 121 or 121' and the second fuse member 122 or 122' is physically separated from the two heat sources 110, a state in which the other fuse member may be physically connected to the two heat sources 110 may be maintained. Accordingly, electric stability between the plurality of heat sources 110 electrically connected through the fuse member 120' or 120" can be improved.

In this case, the first fuse member 121 or 121' and the second fuse member 122 or 122' may also be provided not to be in contact with each other between the two heat sources 110 as illustrated in FIG. 5, or at least a part of the first fuse member 121 or 121' and at least a part of the second fuse member 122 or 122' may also be provided to be in contact with each other between the two heat sources 110 as illustrated in FIG. 6.

However, the connecting manner of the fuse member 120, 120', or 120" and the heat sources 110 is not limited thereto and may be properly changed to a manner through which the two heat sources 110 may be physically connected and fused when a temperature thereof is higher than or equal to a preset temperature.

The insulating member 130 may be disposed to surround the plurality of heat sources 110 disposed in a row to be spaced apart from each other by the gap in the longitudinal direction and the fuse member 120, 120', or 120" connecting the two heat sources 110 in series.

That is, the insulating member 130 may prevent the heat sources 110 and the fuse member 120, 120', or 120", which are conductive members, from being exposed to the outside.

Through this, when the insulating member 130 comes into contact with other components, the insulating member 130 may prevent the heat sources 110 and the fuse member 120, 120', or 120" from being short-circuited through the coming into contact with the other components.

In this case, the heating element 100 or 200 having a fuse function according to one embodiment of the present invention may have two end portions provided with a pair of terminal members 141 and 142 for applying power supplied from the outside to the heat sources 110, and each of the pair of terminal members 141 and 142 may be provided so that one end thereof is connected to the heat source 110 and a length of at least a portion thereof is exposed to the outside.

As an example, the insulating member 130 may include a first insulating member 131 which covers the upper surfaces of the heat sources 110 and the fuse member 120, 120', or 120" and a second insulating member 132 which covers the lower surfaces of the heat sources 110 and the fuse member 120, 120', or 120", and the first insulating member 131 and the second insulating member 132 may be attached thereto through an adhesive layer.

In addition, the insulating member 130 may be provided to cover the plurality of heat sources 110 and at least one fuse member 120, 120', or 120" at the same time.

However, the insulating member 130 is not limited thereto and may be formed as one member.

Meanwhile, the insulating member 130 may have an insulation property for electrical insulation and also have a heat resistant property for preventing damage due to heat generated by the heat sources 110.

As an example, the insulating member 130 may be a film member formed of a resin material having an insulation property and a heat resistant property. As a non-restrictive example, the insulating member 130 may be a known polyimide (PI) film but is not limited thereto, and any material having an insulation property and a heat resistant property may be used as the insulating member 130 without limitation.

In addition, the insulating member 130 may be formed as a coating layer coated with a coating liquid having an insulation property and a heat resistant property or may have a type in which a coating layer and a film member are combined.

Figure 7:
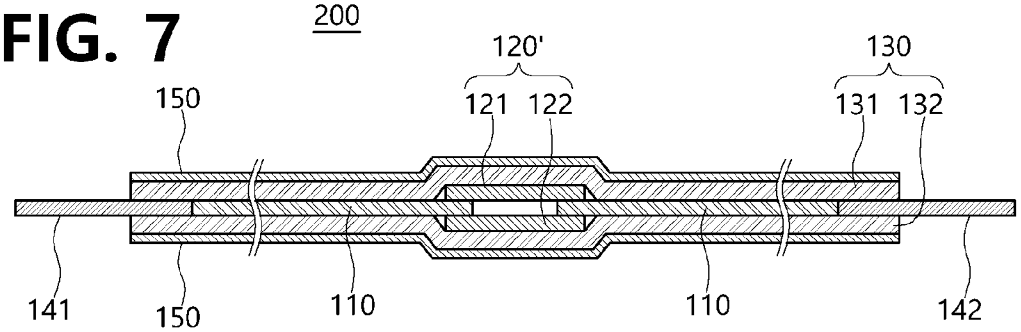
FIG. 7 is a view illustrating a state in which a metal sheet is applied to an outer surface of an insulating member in FIG. 4.

Meanwhile, as illustrated in FIG. 7, the heating element 200 having a fuse function according to one embodiment of the present invention may further include a metal sheet 150 attached to one surface of the insulating member 130 through an adhesive member.

The metal sheet 150 may be a plate-shaped sheet having a predetermined area and may be disposed on at least one surface of the insulating member 130 which covers the heat sources 110 and the fuse member 120, 120', or 120" to form an exposure surface exposed to the outside from the heating element 200.

Through this, the metal sheet 150 can protect the heat sources 110 from an external force and maintain a shape of the heat sources 110, and heat generated by the heat source 110 can be rapidly distributed by the metal sheet 150.

As an example, copper, aluminum, or the like having high heat conductivity may be used as a material of the metal sheet 150. However, the material of the metal sheet 150 is not limited thereto, and any material having high heat conductivity may be used as the material of the metal sheet 150 without limitation.

In addition, in the case in which the heating element 200 having a fuse function according to one embodiment of the present invention includes the metal sheet 150 described above, and the metal sheet 150 forms the exposure surface exposed to the outside, the metal sheet 150 may be a hollow tube in which an inner portion is empty. In this case, the plurality of heat sources 110, the fuse member 120, 120', or 120", and the insulating member 130 may be formed in a form in which the plurality of heat sources 110, the fuse member 120, 120', or 120", and the insulating member 130 are inserted into the hollow tube, and the hollow tube may be formed in a plate shape by pressing the hollow tube.

In the drawing, although the metal sheet 150 is illustrated to be provided in the heating element illustrated in FIG. 5, the present invention is not limited thereto, and the metal sheet 150 may be applied to the heating element illustrated in FIGS. 4 and 6 in the same manner.

Figure 2:
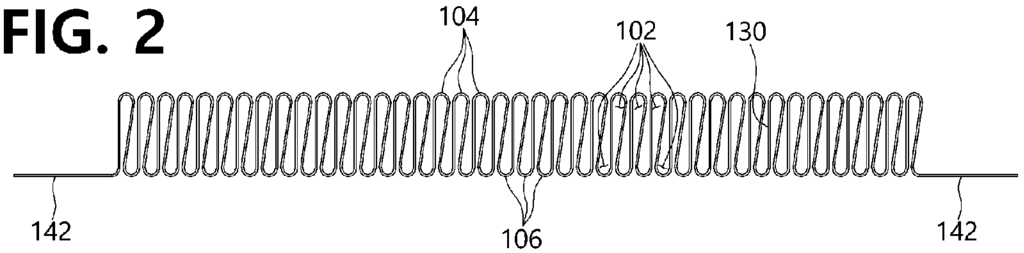
Figure 3:
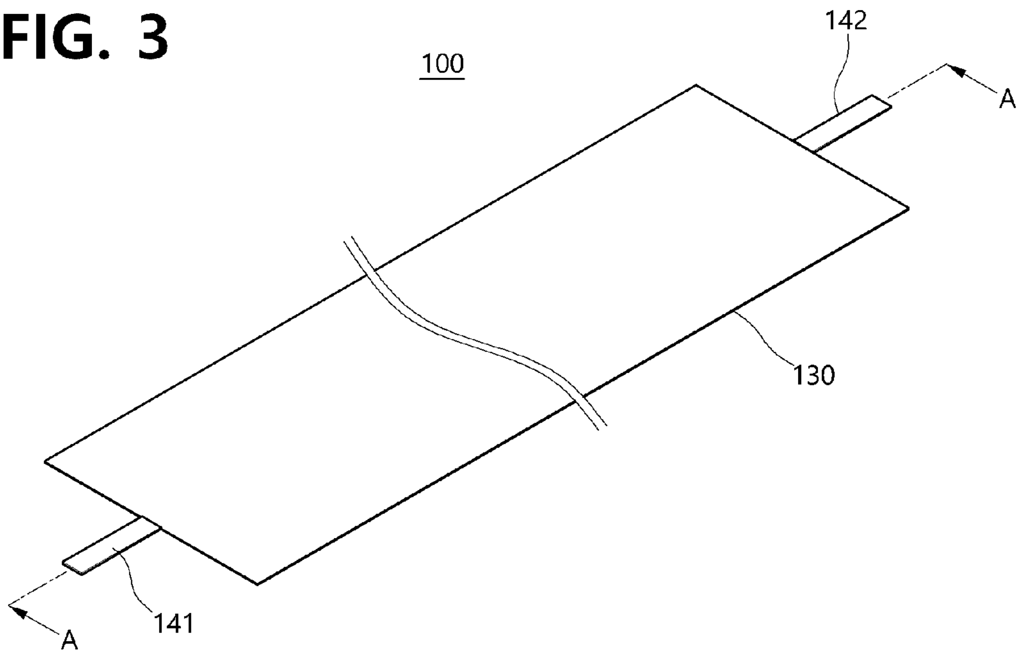
FIG. 3 is a view illustrating a state in which the heating element having a fuse function according to one embodiment of the present invention is unfolded.

Meanwhile, as illustrated in FIGS. 1 and 2, the heating element 100 or 200 having a fuse function according to one embodiment of the present invention may be formed to be bent a plurality of times to form a flow path 102 through which a fluid, such as air, passes in the longitudinal direction.

That is, the heating element 100 or 200 may be formed to be bent the plurality of times to alternately form mountain portions 104 and valley portions 106 in the longitudinal direction.

Through this, in the heating element 100 or 200 having a fuse function according to one embodiment of the present invention, the flow path 102, through which the fluid such as the air may pass, may be formed through the mountain portions 104 and the valley portion 106, and the fluid may be directly heated by the heating element 100 or 200 while passing through the flow path 102.

Accordingly, unlike the conventional case in which heat generated by a heating element is transmitted to a radiating fin and heating target air is heated by coming into contact with the radiating fin, in the heating element 100 or 200 having a fuse function according to one embodiment of the present invention, since the heating element 100 or 200 may directly heat heating target air, a heat transfer process may be minimized, and heat resistance which may occur in the heat transfer process may be reduced so that heat density may increase.

In addition, in the heating element 100 or 200 having a fuse function according to one embodiment of the present invention, since a contact area with a heating target fluid and a heating area are increased through the flow path 102 repeatedly formed in the longitudinal direction, a heat exchange area may be increased so that a large amount of heat may be secured.

Meanwhile, the heating element 100 or 200 having a fuse function described above may be implemented as a heater unit 300 for heating a fluid.

Figure 8:
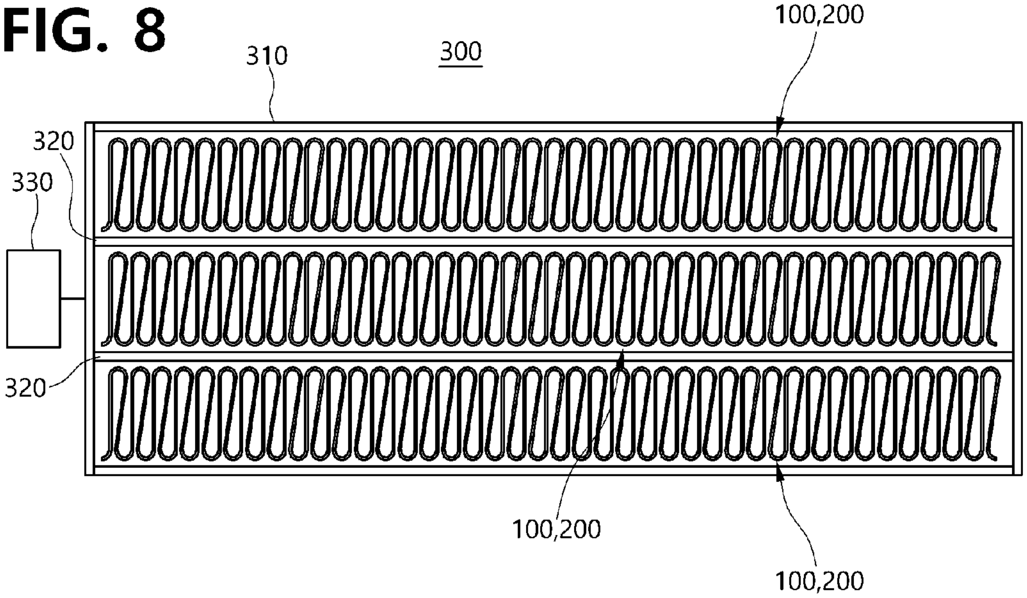
FIG. 8 is an exemplary view illustrating a case in which the heating element having a fuse function according to one embodiment of the present invention is implemented as a heater.

As an example, as illustrated in FIG. 8, the heater unit 300 may include a frame 310 for fixing the plurality of heating elements 100 or 200 described above. In this case, the plurality of heating elements 100 or 200 may be disposed to be spaced apart from each other in a height direction of the frame 310, and both end portions each of the plurality of heating elements 100 or 200 may be fixed to the frame 310.

In this case, an additional support member 320 may be disposed between two heating elements 100 or 200 disposed in the height direction of the frame 310, and a controller 330 for controlling a general driving of the heater unit 300 may be provided outside the frame 310.

In this case, the heating element 100 or 200 may include all of the above-described components.

Through this, a heating target fluid may be directly heated by the heating element 100 in a process in which the fluid passes through the flow path 102 formed in the heating element 100 or 200 so that a temperature rising time can be decreased.

The heating element 100 or 200 and the heater unit 300 described above may also be installed in an air conditioning apparatus of a vehicle to be applied to an air conditioning heater of a vehicle for heating air suctioned into the air conditioning apparatus. However, a usage of the heating element and the heater unit is not limited thereto and may be applied to any product which increases a temperature of a fluid through heat exchange.

While the embodiments of the present invention have been described above, the spirit of the present invention is not limited to the embodiments proposed in this specification, and other embodiments may be easily suggested by adding, changing, and deleting components by those skilled in the art and will fall within the spiritual range of the present invention.

The invention claimed is:

1. A heating element having a fuse function, and configured to heat a fluid, the heating element comprising:
- a plurality of heat sources which generate heat to heat the fluid when power is applied;
- a fuse member having two end portions, wherein each of the two end portions is physically connected to one of two heat sources disposed to be spaced apart from each other by a gap, wherein the fuse member connects the two heat sources in series, and wherein the fuse member is fused to cut an electrical connection of the two heat sources when a temperature is higher than or equal to a preset temperature; and
- an insulating member which surrounds the plurality of heat sources and the fuse member,
- wherein each of the plurality of heat sources is a plate-shaped conductive member having a predetermined area, and
- wherein the fuse member is disposed between the two heat sources which are disposed to be spaced apart from each other by the gap in a longitudinal direction of the heating element.

2. The heating element of claim 1, wherein the fuse member is a plate-shaped conductive member having a predetermined area.

3. The heating element of claim 1, wherein the two end portions of the fuse member are connected to upper surfaces or lower surfaces of the two heat sources disposed to be spaced apart from each other by the gap.

4. The heating element of claim 1, wherein the fuse member includes:
- a first fuse member comprising two end portions connected to upper surfaces of the two heat sources disposed to be spaced apart from each other by the gap; and
- a second fuse member comprising two end portions connected to lower surfaces of the two heat sources.

5. The heating element of claim 4, wherein at least a part of the first fuse member and at least a part of the second fuse member are in contact with each other between the two heat sources.

6. The heating element of claim 1, wherein the insulating member is a film member having an insulation property.

7. The heating element of claim 1, wherein the heating element is formed to be bent a plurality of times in a longitudinal direction to form a flow path through which the fluid passes.

8. The heating element of claim 7, wherein:
- the heating element is formed to be bent the plurality of times in the longitudinal direction to alternately form a mountain portion and a valley portion; and
- the flow path is a space formed by the mountain portion and the valley portion.

9. The heating element of claim 1, further comprising a metal sheet attached to one surface of the insulating member through an adhesive layer.

10. A heater unit comprising the heating element having the fuse function of claim 1.

* * * * *